(No Model.)
W. D. STEELE.
CORN HARVESTER.
No. 402,040. Patented Apr. 23, 1889.
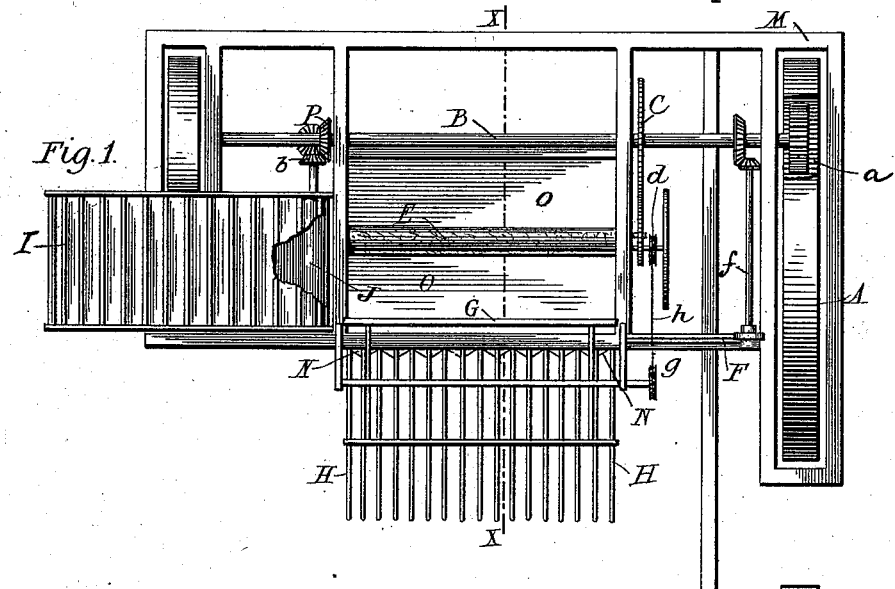
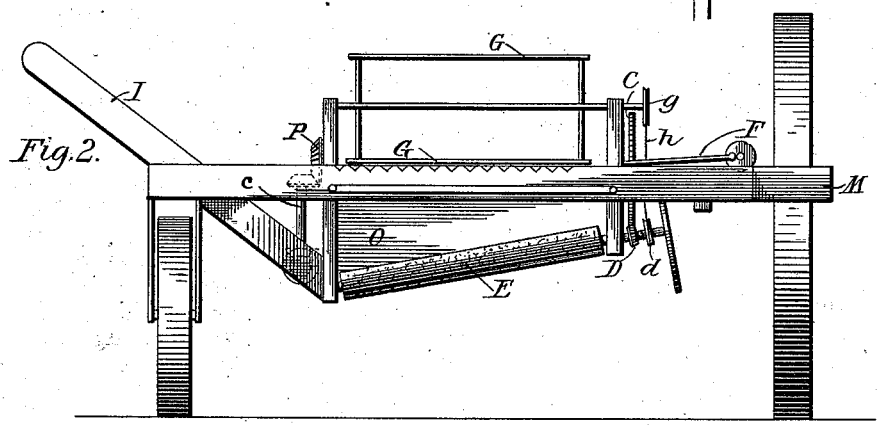
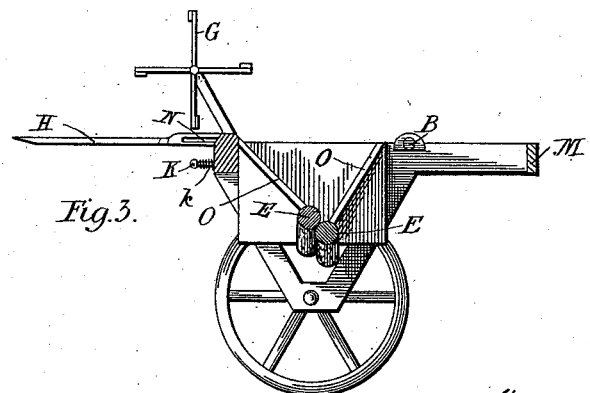
Witnesses.
Inventor,
William D. Steele
By his Attorney
Schuyler Duryee

United States Patent Office.

WILLIAM D. STEELE, OF HURON, DAKOTA TERRITORY, ASSIGNOR OF ONE-HALF TO JOHN E. WARD, OF SAME PLACE.

CORN-HARVESTER.

SPECIFICATION forming part of Letters Patent No. 402,040, dated April 23, 1889.

Application filed January 27, 1887. Serial No. 225,728. (No model.)

*To all whom it may concern:*

Be it known that I, WILLIAM D. STEELE, a citizen of the United States, residing at Huron, in the county of Beadle and Territory of Dakota, have invented a new and useful Corn-Harvester, of which the following is a specification.

My invention relates to improvements in corn-harvesters by which corn may be picked from the standing stalks in the field and the husks entirely separated therefrom. I attain this object by the mechanism illustrated in the accompanying drawings, in which—

Figure 1 is a plan view of the entire machine. Fig. 2 is a front view, and Fig. 3 is a section on the line X X in Fig. 1.

Similar letters refer to similar parts in the several views.

A is the driving-wheel mounted in the frame M, and having a gear, $a$, attached to it, and operating the driving-shaft B, upon which is a gear-wheel, C, operating the rollers E by the wheel D. The rollers E are inclined laterally of the machine, one being slightly higher than the other, as shown in Fig. 3, and may be made of wood, rubber, or metal, and covered with a rough material, as shall be found best adapted to the work.

At N is an ordinary cutter operated by the pitman at F and shaft $f$ from the shaft B. Guards or fingers are provided at H.

The lower end of the elevator I is provided with a drum, J, that is journaled in the frame which supports the elevator. To one end of the shaft of the drum is a gear-wheel, $b$, which meshes with a similar wheel on an upright shaft, $c$, the upper end of which shaft has a miter-gear that engages with a miter-gear, P, on shaft B.

The machine is drawn through the standing corn, and the stalks pass through the fingers H until the ears are caught and pulled off or cut off by the cutter N. A small yielding roller, K, below the cutter N, held forward by springs $k$, prevents the stalks being drawn back and cut off with the ears of corn. The ears, when cut off, are pushed back by the reel G into the hopper O, having downwardly-converging front and rear sides, at the bottom of which are the rollers E, revolving toward each other, by which the husks are stripped off, the husked corn sliding down the inclined rolls to the lower end of the elevator I, by which it is raised into a wagon-box alongside, or the elevator may be replaced by a box at the lower end of the rolls, which may be emptied, as required. The shaft of the reel G has a pulley, $g$, at one end, connected at one end by an endless belt, $h$, to a larger pulley, $d$, on the shaft of one of the rollers E, and thereby the said reel is driven when the machine is in motion, as will be readily understood.

Having thus described my invention, what I claim, and wish to secure by Letters Patent, is—

In a corn harvester and husker, the main frame, the cutting apparatus on the front side thereof, the hopper in the main frame having the downward converging front and rear sides, the inclined husking-rollers journaled at the lower edges of the converging sides of the hopper, one of said rollers being in a slightly higher plane than the other, the driving-wheel journaled in one side of the main frame, the shaft B, geared to the said wheel, gears connecting said shaft to the husking-rollers, the sweep-reel mounted on the front of the frame and connections between the same and one of the husking-rollers, whereby said reel is rotated, and the inclined elevator projecting from the side of the frame opposite the driving-wheel, the lower roller of said elevator being in proximity to the lower ends of the husking-rollers and geared to the shaft B, all in combination, substantially as described.

WILLIAM D. STEELE.

Witnesses:
C. H. CAMERON,
T. W. HOOD.